(12) United States Patent
Martinsson et al.

(10) Patent No.: US 9,186,737 B2
(45) Date of Patent: Nov. 17, 2015

(54) CHAINSAW WITH A SHARPENING ELEMENT

(75) Inventors: Pär Martinsson, Jönköping (SE); Johan Svennung, Jönköping (SE); Peter Lameli, Nürtingen (DE); Ottmar Locher, Ulm (DE); Christoph Schiedt, Burgrieden (DE); Martin Bepler, Ulm (DE); Hans Waigel, Schnürpflingen (DE)

(73) Assignee: HUSQVARNA AB, Huskvarna (SE)

( * ) Notice: Subject to any disclaimer, the term of this patent is extended or adjusted under 35 U.S.C. 154(b) by 130 days.

(21) Appl. No.: 13/579,959

(22) PCT Filed: Feb. 20, 2010

(86) PCT No.: PCT/EP2010/001072
§ 371 (c)(1),
(2), (4) Date: Oct. 9, 2012

(87) PCT Pub. No.: WO2011/100996
PCT Pub. Date: Aug. 25, 2011

(65) Prior Publication Data
US 2013/0025132 A1 Jan. 31, 2013

(51) Int. Cl.
*B23D 63/16* (2006.01)
*B26F 1/38* (2006.01)
(Continued)

(52) U.S. Cl.
CPC ............ *B23D 63/168* (2013.01); *B23D 63/005* (2013.01); *B23D 63/16* (2013.01); *B23D 63/166* (2013.01); *B26F 1/382* (2013.01); *B27B 17/08* (2013.01)

(58) Field of Classification Search
CPC ...... B23D 63/16; B27B 17/08; B26D 63/166; B26D 63/168; B26D 63/005
USPC .................. 30/181, 381–387, 453, 138–139; 76/82–89, 80.5; 83/174; 451/419–423
See application file for complete search history.

(56) References Cited

U.S. PATENT DOCUMENTS 2,651,336 A 9/1953 Warren
2,821,097 A 1/1958 Carlton
(Continued)

FOREIGN PATENT DOCUMENTS

DE 10154900 A1 5/2003
GB 842096 A 7/1960
(Continued)

OTHER PUBLICATIONS

International Search Report and Written Opinion of PCT/EP2010/001072 mailed Nov. 25, 2010.
(Continued)

*Primary Examiner* — Kenneth E. Peterson
*Assistant Examiner* — Nhat Chieu Do
(74) *Attorney, Agent, or Firm* — Nelson Mullins Riley & Scarborough LLP

(57) ABSTRACT

A self-powered chainsaw, typically a battery powered chainsaw, including a housing, a power source, an endless cutting chain having a plurality of cutting elements and a motor arranged to drive the chain relative to the housing using power from the power source. The chainsaw also includes a sharpening element which is arranged so as to be driven relative to the cutting elements and the housing using the power source.

9 Claims, 2 Drawing Sheets

(51) Int. Cl.
  *B23D 63/00* (2006.01)
  *B27B 17/08* (2006.01)

(56) References Cited

U.S. PATENT DOCUMENTS

| | | | |
|---|---|---|---|
| 3,138,973 A | | 6/1964 | Muir |
| 3,301,098 A | | 1/1967 | Oehrli |
| 3,527,122 A | | 9/1970 | Oehrli |
| 4,062,253 A | * | 12/1977 | Dilworth ............ 76/80.5 |
| 4,457,069 A | * | 7/1984 | Close ............... 30/138 |
| 4,587,867 A | * | 5/1986 | Pokorny et al. ....... 76/25.1 |
| 5,156,071 A | | 10/1992 | Stevens |
| 5,941,138 A | * | 8/1999 | Beck et al. ........... 76/41 |
| 6,058,806 A | | 5/2000 | Ford |
| 6,318,874 B1 | * | 11/2001 | Matsunaga ........... 362/119 |
| 6,939,022 B2 | * | 9/2005 | Brooks .............. 362/120 |
| 7,320,635 B2 | | 1/2008 | Cendak |
| 2006/0137489 A1 | | 6/2006 | Nishigaki et al. |
| 2010/0257743 A1 | * | 10/2010 | George .............. 30/383 |

FOREIGN PATENT DOCUMENTS

| | | |
|---|---|---|
| JP | 61020301 U | 2/1986 |
| WO | 9600627 A1 | 1/1996 |

OTHER PUBLICATIONS

Chapter I International Preliminary Report on Patentability of PCT/EP2010/001072 mailed Aug. 21, 2012.

* cited by examiner

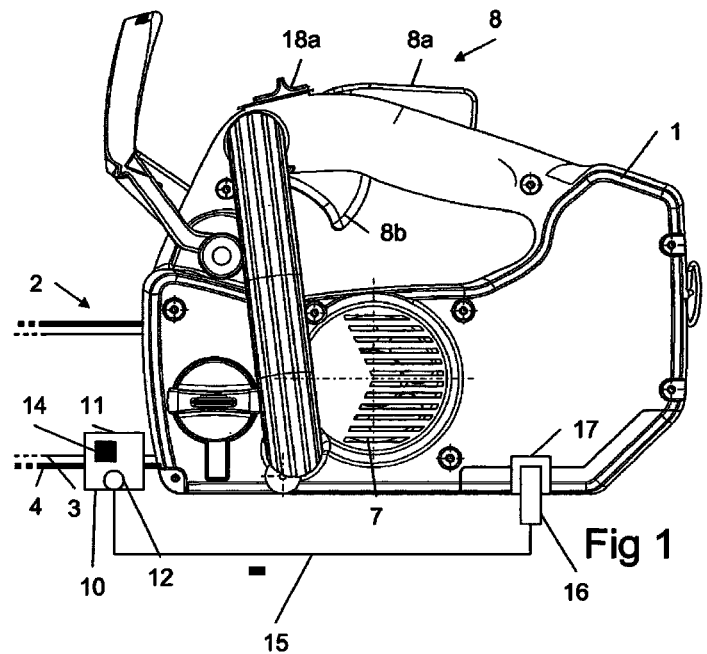
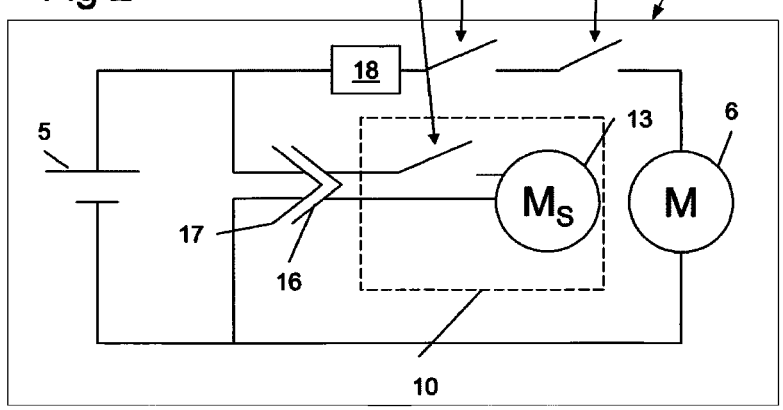

CHAINSAW WITH A SHARPENING ELEMENT

This invention relates to chainsaws.

Chainsaws are well known power tools, and generally comprise an endless cutting chain carrying a plurality of cutting elements, driven by a motor along its own length relative to a housing. Cutting is achieved by pressing the moving chain—and so the cutting elements—against the subject to be cut. Self-powered chainsaws, such as battery or petrol driven chainsaws, are also well known, and carry their source of power (that is, an electric battery or a supply of combustible fuel) with them.

However, the cutting elements of a chainsaw will require regular sharpening, as the cutting elements wear in use. The standard method of achieving this involves manually filing each cutting element with a special tool; given that most consumers (as opposed to commercial users) will not have such special tools, frequently such users will need to resort to taking their chainsaw to a third party for sharpening. This sharpening process is therefore inconvenient.

Various automatic sharpening schemes have been proposed. U.S. Pat. No. 6,058,806 proposes an automatic chain sharpening apparatus which receives the exposed part of the chain of a chainsaw (that is, the part not within the housing) and provides a sharpening device and a means for driving the chain along its length independent of the motor. However, this is a bulky and complicated device.

Top sharpening chains have also been proposed in such documents as U.S. Pat. No. 6,435,070, where the face of the cutting element which is ground in order to sharpen the chain is chosen so as to be on top (that is, outermost as the chain is driven) of the chain, so that a sharpening element can simply be placed into contact with the cutting elements. Sharpening is achieved by moving the chain with the motor of the chainsaw past the sharpening element with it in contact with the cutting elements. However, the chain has to be moved quicker than normal in order to achieve satisfactory sharpening of the cutting elements.

According to a first aspect of the invention, there is provided a self-powered chainsaw, comprising a housing, a power source, a endless cutting chain having a plurality of cutting elements and a motor arranged to drive the chain relative to the housing using power from the power source, in which the chainsaw further comprises a sharpening element which is arranged so as to be driven relative to the cutting elements and the housing using the power source.

As such, this provides a sharpening element which is included within the chainsaw, using the same power source as the motor; this is more convenient to a user than having to separately power the sharpening element. Having the sharpening element move relative to the housing means that it is not necessarily required to move the cutting elements relative to the sharpening element; this means that it is not required to move the cutting elements at high speed past the sharpening element.

The sharpening element may have a housing, which may be the housing of the chainsaw or a separate housing. The sharpening element may be mounted for rotation relative to the cutting elements in its housing.

Where a separate housing is employed, the chainsaw may comprise a selective connection between the housing of the sharpening element and the power source. This may be of the form of a removable plug and socket, with the sharpening element having one of the plug and socket and the housing of the chainsaw having the other of the plug and socket.

Alternatively, where the housing of the sharpening element is the housing of the chainsaw, the sharpening element may be connected to the power source within the housing of the chainsaw. The sharpening element may be movably mounted within the housing, so that it can be brought into or out of contact with the cutting elements by action of the user. As such, the sharpening element may be mounted in the housing so that the user can move it into or out of contact with the cutting elements; alternatively, the chainsaw may comprise drive means arranged to drive the sharpening element into or out of contact with the cutting elements, typically as instructed by a user.

The chainsaw may comprise a further motor, arranged to drive the sharpening element relative to the cutting elements and the housing of the chainsaw. Accordingly, the chainsaw can have two separate motors, which can be separately adapted to their tasks—the further motor will generate higher speeds but under lower load, whereas the motor of the chainsaw will be lower speed but higher load as it drives the cutting elements to cut. Provision of a further motor also means that the chain can be driven whilst it is being sharpened; this may allow for the cutting elements to be moved past the (separately drive) sharpening elements once they have been sharpened.

Typically, the power source will be an electric battery, and the motor (and any further motor) will be an electric motor.

The chainsaw may comprise a controller, arranged to control how the motor drives the chain based upon manipulation of at least part of the controller by a user. The controller may have a normal mode, in which the chain will run continuously so as to be usable for cutting when a user so commands, and a step mode, where the chain will move only in discrete steps. The step mode will be useful when it desired to individually sharpen each, typically discretely placed, cutting element. The controller may comprise a selection element, such as a switch, by means of which the user can select whether the controller is in the step mode or the normal mode.

In an alternative, the chainsaw comprises a stepping motor, which when energised by the power source moves the chain in discrete steps. In such a case, a controller may be provided which selects between a normal mode where the motor drives the chain and a step mode where the stepping motor drives the chain.

In a further embodiment, the chainsaw comprises an automatic mode, in which, when energised by the power source the chainsaw moves the chain in discrete steps, whilst the sharpening element is driven whilst the chain is stationary.

In another possible embodiment, the chainsaw comprises a semi-automatic mode, in which, when energised by the power source the chainsaw moves the chain in discrete steps, whilst the chain can be manually sharpened in particular during the period whilst the chain is stationary. By this, a person manually sharpening the chainsaw, will be able to constantly hold the sharpening device in his hands and keep the orientation of the sharpening tool in respect to the chain.

It is of advantage, if the chainsaw is provided with adjustment means, preferably a manual operable controller such as a selector or switch that allows for an individual adjustment of the time sequence of the discrete steps with which the chainsaw moves. This will enable a user to adopt the speed of the motor to his individual speed of manual sharpening.

The controller may isolate the motor in the step mode, so that a user cannot inadvertently drive the chain at full speed.

There now follows, by way of example only, embodiments of the invention described with reference to the accompanying drawings, in which:

FIG. 1 shows a side elevation of a chainsaw according to a first embodiment of the invention;

FIG. 2 shows a circuit diagram of the electric circuit controlling the chainsaw of FIG. 1.

Figure 3:
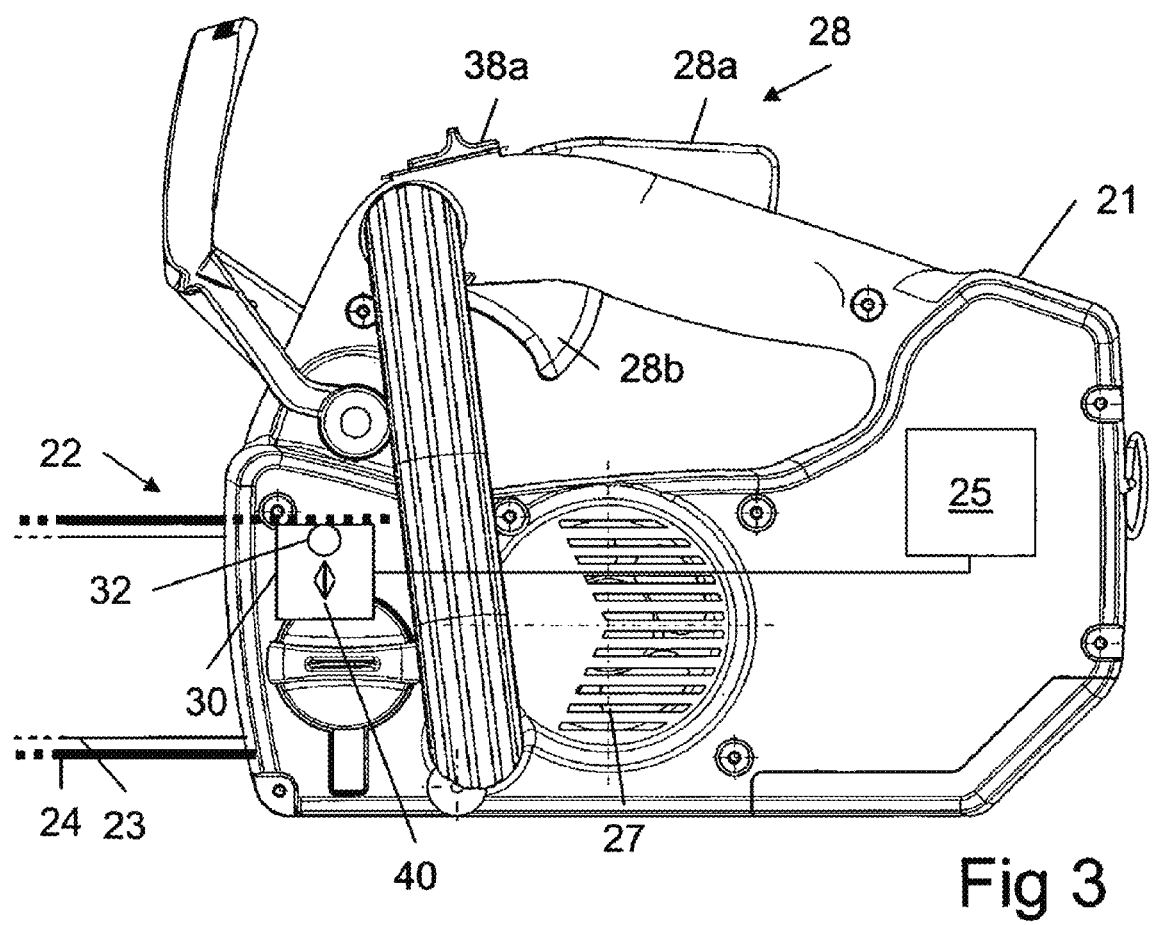
FIG. 3 shows a side elevation of a chainsaw according to a second embodiment of the invention.

A chainsaw according to an embodiment of the invention is shown in the accompanying drawings. It comprises a housing 1 supporting a cutting tool 2. The cutting tool 2 comprises an elongate support 3 over which an endless loop of cutting chain 4 runs. The cutting chain 4 has cutting elements on each link.

In order to drive the cutting chain 4, a battery 5 and a motor 6 (both shown in FIG. 2) are provided in the housing 1. The motor 6 acts to rotate a drive wheel 7 and so drive the chain 4 around the support 3 when current is supplied to it by the battery 5.

The main control a user has over the operation of the chainsaw is by the use of the control element main switch 8, which forms a control element. The user must squeeze both parts 8a, 8b of the main switch in order to allow current to flow from the battery 5 to the motor 6 and so drive the cutting chain 4 to cut.

The chainsaw is also provided with a sharpening unit 10, comprising a housing 11 within which a sharpening grindstone 12 is rotatably mounted. This is driven for high-speed rotation by motor 13. A switch 14 controls activation of the motor 13.

The sharpening unit 10 is powered from the same battery 5 as the motor 6 which drives the chain 4. In order to do this, the sharpening unit is provided with a power cable 15, which terminates in a plug 16. This connects releasably into a socket 17 formed in the housing 1 of the chainsaw. This plug-and-socket connection electrically links the sharpening unit 10 to the battery 5, as shown in FIG. 2 of the accompanying drawings.

In FIG. 1, the sharpening unit 10 is shown as a unit that can clamp onto the chain 4. However, it could also be provided as a hand-held device that the user applies to the appropriate surface of the cutting elements. Even in this case, it will still be convenient for the user to plug the sharpening unit 10 into the socket 17 on the chainsaw, rather than having to find another source of power for the sharpening unit 10; the sharpening unit can be made less bulky if it is relying on the battery 5 of the chainsaw.

When a user has finished sharpening the chain 4, they can simply disconnect plug 16 from socket 17 and store the sharpening unit 10 safely; the housing 1 of the chainsaw may have a storage port for the sharpening unit 10, or the user can simply store it in a convenient place until the chain 4 needs sharpening once more.

In a further aid to chain sharpening, the chainsaw has a controller 18, having a mode switch 18a. In a normal mode of the chainsaw, the mode controller allows the motor of the chainsaw to function as normal—in effect, with regards to the circuit diagram of FIG. 2, it acts as a closed switch. However, in a step mode, for every actuation of the main switch 8, the controller 18 will allow the chain 4 to be driven one step. The size of the step will be the spacing of the cutting elements on the chain 4.

This means that after the user has sharpened one tooth with the sharpening unit 10, the main switch 8 can be activated in order to move the cutting elements around so the next element to be sharpened is in the position previously occupied by the last element to be sharpened. Thus, the used does not need to move around the chain; they can always sharpen the element in the most convenient position. Preferably, the movement is slower than the normal movement, so as not to surprise the user.

Of course, the user is free to move the chain 4 manually, if they feel that that is more convenient to them.

The controller may also provide an off-mode, when it acts as an open switch and so isolates the motor 6 regardless of whether the main switch 8 is activated.

A second embodiment of the invention is shown in FIG. 3 of the accompanying drawings. In this embodiment, features common to the first embodiment are depicted with the same reference numerals, raised by 20.

In this second embodiment, rather than being provided externally of the housing 1 as in the first embodiment, the sharpening unit 30 is provided inside the housing 1, adjacent to the chain 24. The sharpening element 32 can be moved into or out of contact by means of a spring-loaded solenoid (not shown) as depicted by arrow 40. The solenoid acts in response to mode switch 38a; if the mode switch 38a selects the step mode, then the solenoid urges the sharpening element 32 into contact with the cutting elements of chain 24. In normal mode, the spring force drives the sharpening element 32 away from the chain 24.

The sharpening unit 30 is still connected to the battery 25; however, the plug 16 and socket 17 of the previous embodiment are not required, as the sharpening unit is not removed when out of use (as the sharpening element 32 is moved out of the way in the normal mode). Activation of the main switch in the step mode has the effect of causing the motor of the sharpening unit 30 to drive the sharpening element 32 for rotation relative to the housing 1 and the cutting elements of the chain 24, whilst the motor of the chainsaw (not shown) periodically drives the chain stepwise to move the next cutting element into engagement with the sharpening unit.

In an further embodiment, an automatic mode of the chainsaw is provided which functions as in the step mode above, but the sharpening element 32 driven and brought into contact with the cutting element only when the chain is not moving—that is, between each individual step. Thus, an automatic sharpening of the chain can be achieved.

The invention claimed is:

1. A self-powered chainsaw, comprising;
   a housing,
   an electric power source,
   an endless cutting chain having a plurality of cutting elements,
   an electric motor arranged to drive the chain relative to the housing using power from the electric power source,
   a sharpening element which is configured to be driven relative to the cutting elements and the housing, and
   a controller configured to control how the endless cutting chain is driven, the controller having a normal mode in which the endless cutting chain is continuously driven so that it is usable for cutting, and a step mode in which the chain is driven only in discrete steps, and wherein the sharpening element uses the electric power source and is driven at least a portion of the time when the controller is operating in the step mode, wherein in the step mode, the electric motor drives the endless cutting chain in steps, wherein a size of each step is determined by the spacing of the cutting elements of the chain.

2. The chainsaw of claim 1, in which the sharpening element has a separate housing from the housing of the chainsaw.

3. The chainsaw of claim 1, in which the sharpening element is disposed within the housing of the chainsaw.

4. The chainsaw of claim 1, in which the sharpening element is connected to the electric power source within the housing of the chainsaw.

5. The chainsaw of claim 1, in which the sharpening element is movably mounted within the housing, so that the sharpening element is enabled to be brought into or out of contact with the cutting elements by action of a user.

6. The chainsaw of claim 1, further comprising a second motor configured to drive the sharpening element relative to the cutting elements and the housing of the chainsaw.

7. The chainsaw of claim 1, wherein the chainsaw further comprises an automatic mode in which the chain is moved in the discrete steps while the sharpening element remains stationary relative to housing.

8. The chainsaw of claim 1, wherein the chainsaw further comprises a semi-automatic mode in which the chain is moved in the discrete steps when powered from the electric power source, and wherein the sharpening element is employed to sharpen the chain while the chain is stationary.

9. The chainsaw of claim 1, wherein the controller comprises a manual operable controller enabling an operator to adjust a time sequence of driving the chain in the discrete steps.

* * * * *